(12) United States Patent
Mazumdar et al.

(10) Patent No.: US 8,668,751 B2
(45) Date of Patent: Mar. 11, 2014

(54) SYSTEM AND METHOD FOR CONCENTRATING A SOLID FUEL IN A SLURRY

(75) Inventors: Anindra Mazumdar, Katy, TX (US); Pradeep Stanley Thacker, Bellaire, TX (US)

(73) Assignee: General Electric Company, Schenectady, NY (US)

( * ) Notice: Subject to any disclaimer, the term of this patent is extended or adjusted under 35 U.S.C. 154(b) by 777 days.

(21) Appl. No.: 12/941,757

(22) Filed: Nov. 8, 2010

(65) Prior Publication Data

US 2012/0110908 A1    May 10, 2012

(51) Int. Cl.
*B01J 8/00*     (2006.01)

(52) U.S. Cl.
USPC .............. 48/61; 48/76; 48/127.9; 48/127.1; 48/DIG. 7; 48/71; 48/72; 48/73

(58) Field of Classification Search
USPC .............. 48/61, 127.9, 127.1, 76, 71, 72, 73
See application file for complete search history.

(56) References Cited

U.S. PATENT DOCUMENTS

| | | | |
|---|---|---|---|
| 3,971,639 A * | 7/1976 | Matthews | 48/202 |
| 4,442,665 A | 4/1984 | Fick et al. | |
| 4,482,358 A | 11/1984 | Hsieh et al. | |
| 5,635,074 A * | 6/1997 | Stenstrom et al. | 210/739 |
| 5,766,290 A * | 6/1998 | Zievers et al. | 55/523 |
| 2007/0119099 A1 | 5/2007 | Wallace | |
| 2007/0283812 A1 | 12/2007 | Liu et al. | |
| 2009/0158663 A1 | 6/2009 | Deluga et al. | |
| 2009/0259082 A1 | 10/2009 | Deluga et al. | |
| 2010/0043290 A1 | 2/2010 | Thacker et al. | |

* cited by examiner

*Primary Examiner* — Kaity V. Handal
(74) *Attorney, Agent, or Firm* — Fletcher Yoder, P.C.

(57) ABSTRACT

A system includes a first cross-flow filter configured to remove at least a first portion of a liquid from a fuel slurry to increase a concentration of a solid fuel in the fuel slurry. The system also includes a gasifier configured to generate a syngas from the fuel slurry.

20 Claims, 5 Drawing Sheets

SYSTEM AND METHOD FOR CONCENTRATING A SOLID FUEL IN A SLURRY

BACKGROUND OF THE INVENTION

The subject matter disclosed herein relates to a system and method for concentrating a solid fuel in a slurry prior to gasification.

Syngas may be produced by the gasification of a feedstock, such as coal, and may be utilized as fuel, e.g., in an integrated gasification combined cycle (IGCC) power plant. Prior to gasification, the feedstock may be transferred to a gasifier by a pump. The feedstock may consists of a slurry (i.e., a suspension of a solid fuel in a liquid). The ability to pump the slurry, as determined by the slurry's viscosity and stability, may determine and limit the concentration of the slurry. Prior to pumping the slurry, the concentration of the solid fuel in the slurry may be affected by the addition of surfactants. However, the concentrations obtained with surfactants also may be limited to concentrations where the slurry is stable and viscous enough for pumping. Thus, the inability to obtain higher concentrations of the solid fuel in the slurry may limit carbon conversion and cold gas efficiency during gasification.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a first cross-flow filter configured to remove at least a first portion of a liquid from a fuel slurry to increase a concentration of a solid fuel in the fuel slurry. The system also includes a gasifier configured to generate a syngas from the fuel slurry.

In accordance with a second embodiment, a system includes a slurry concentration controller configured to control a concentration of a solid fuel in a fuel slurry for gasification, wherein the slurry concentration controller is configured to adjust removal of a liquid from the fuel slurry via a cross-flow filter.

In accordance with a third embodiment, a method includes controlling a concentration of a solid fuel in a fuel slurry at least partially by adjusting removal of a liquid from the fuel slurry via a cross-flow filter. The method also includes gasifying the fuel slurry in a gasifier downstream from the cross-flow filter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for concentrating a solid fuel (e.g., coal) in a slurry (i.e., solid fuel suspended in water or another liquid) prior to gasification. Pumps convey the slurry to the gasifier via a slurry injector. The concentration of the solid fuel within the slurry is limited by the ability to pump the slurry due to characteristics of the slurry, such as viscosity and stability. Efforts to affect the solid fuel concentration within the slurry, prior to pumping, include adding surfactants. However, even with surfactants, the obtainable concentration is limited to concentrations where the slurry is still stable and viscous enough for pumping.

Embodiments of the present disclosure provide a system that includes at least one cross-flow filter configured to remove liquid (e.g., water) from the slurry to concentrate the solid fuel prior to gasification. For example, the system may include at least one cross-flow filter disposed in the flow path of the slurry downstream of a fuel slurry pump and upstream of a fuel slurry injector. The cross-flow filter may include a filter medium that converges in a downstream direction along the flow path of the slurry. Also, the cross-flow filter may include multiple slurry flow paths. The system may include multiple cross-flow filters disposed in parallel and/or series. Further, the system may include an agitation system, a heating system, and/or a purging system. Additional embodiments include a control system that includes a controller configured to control the concentration of the solid fuel in the slurry. For example, the controller may control the slurry concentration by adjusting the amount of liquid (e.g., water) removed from the slurry. Also, the controller may control the agitation system, the heating system, and/or the purging system to improve water removed in the filter. Further embodiments include a method for controlling the concentration of the solid fuel in the fuel slurry with a cross-flow filter prior to gasifying the slurry in a gasifier downstream of the filter. For example, control may occur by adjusting the removal of liquid from the slurry. In each of the disclosed embodiments, the systems and methods are designed to concentrate the solid fuel in the slurry by removing liquid from the slurry via a cross-flow filter.

Figure 1:
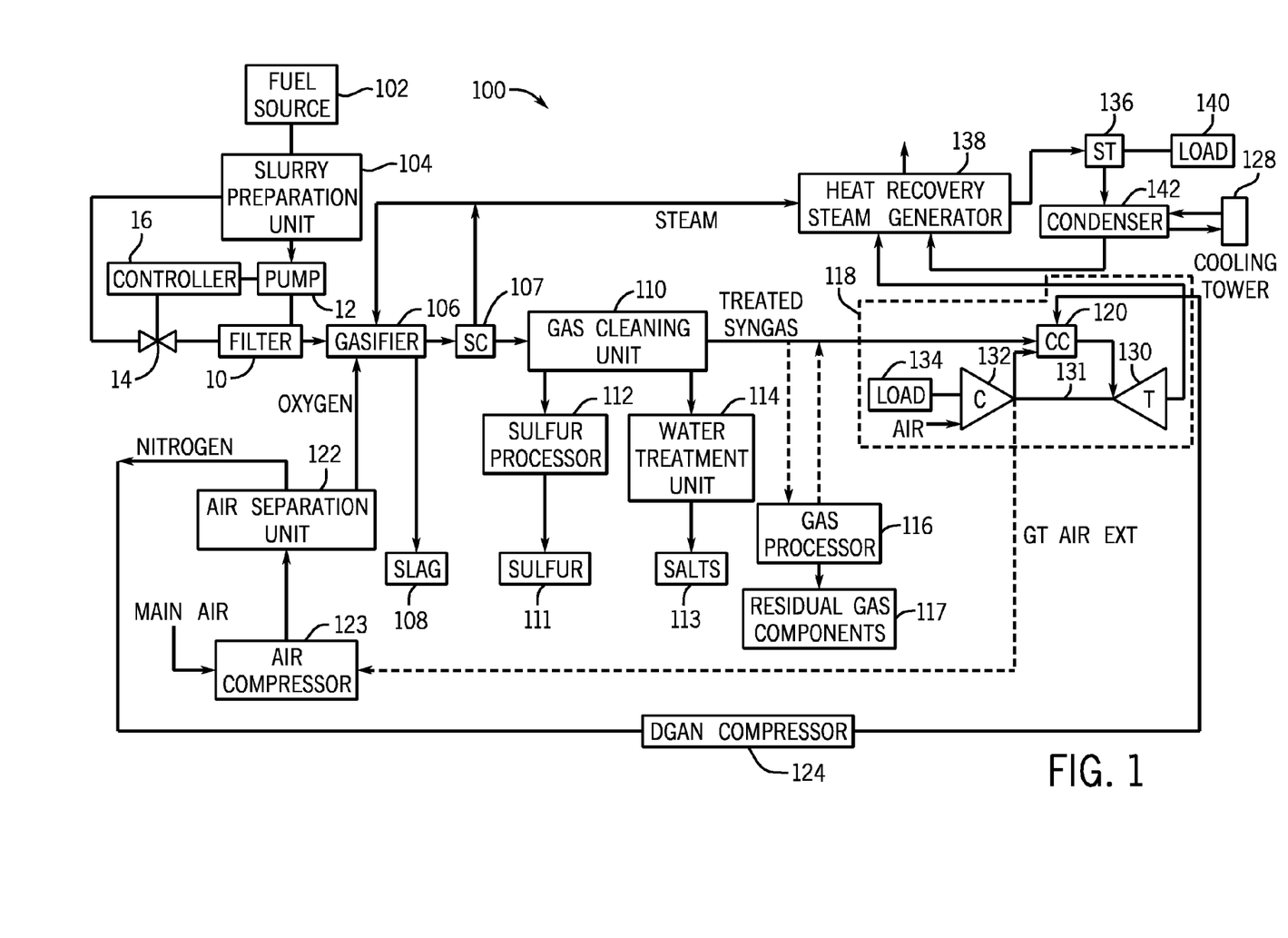
FIG. 1 is a schematic block diagram of an embodiment of an integrated combined cycle (IGCC) power plant utilizing a filter to increase solid fuel concentration in a slurry.

Turning now to the figures, FIG. 1 is a schematic block diagram of an embodiment of an integrated combined cycle (IGCC) system 100 utilizing a filter 10 to increase solid fuel concentration in a slurry as mentioned above. The filter 10 may be, e.g., a cross-flow filter 10. With the cross-flow filter 10, the flow of the slurry travels tangentially across a surface or filter medium of the filter 10. The cross-flow filter 10 may be made of a high tensile material, such as a sintered metal alloy. The metal alloy may include nickel, molybdenum, chromium, and/or tungsten, as well as other metals and metal oxides. The filter medium of the filter 10 may include perforations of approximately 1 μm to 10 μm in diameter, or any other suitable range. As the slurry flows tangentially across the cross-flow filter 10 at a high velocity and a positive pressure, liquid (e.g., water) is forced through the perforations as a filtrate, while the solid fuel remains within the slurry. The flow of the slurry prevents buildup of particles on the filter medium. Although the cross-flow filter 10 is discussed with reference to the IGCC system 100 in FIG. 1, the disclosed embodiments of the cross-flow filter 10 may be used in any suitable application (e.g., production of chemicals, fertilizers, substitute natural gas, transportation fuels, or hydrogen). In other words, the following discussion of the IGCC system 100 is not intended to limit the disclosed embodiments to IGCC.

The IGCC system 100 produces and burns a synthetic gas, i.e., syngas, to generate electricity. Elements of the IGCC system 100 may include a fuel source 102, such as a solid feed or solid fuel, that may be utilized as a source of energy for the IGCC. The fuel source 102 may include coal, petroleum coke, biomass, wood-based materials, agricultural wastes, tars, asphalt, or other carbon containing items. The solid fuel of the fuel source 102 may be passed to a slurry preparation unit 104. The slurry preparation unit 104 may, for example, resize or reshape the fuel source 102 by chopping, milling, shredding, pulverizing, briquetting, or pelletizing the fuel source 102, then mix the fuel source 102 (e.g., coal) with a liquid solvent (e.g., water) to generate a fuel slurry (e.g., coal slurry).

In the illustrated embodiment, a pump 12 delivers the feedstock from the slurry preparation unit 104 to a filter 10 (e.g., cross-flow filter 10). The filter 10 is configured to remove at least a portion of the liquid from the fuel slurry to increase the concentration of the solid fuel in the fuel slurry as described above. The filter 10 is coupled to one or more valves 14. The valve 14 enables control of the amount of liquid to be removed from the slurry. In certain embodiments, the valve 14 may be used to allow the flow of liquid (e.g., water) into the filter 10 to purge or clean the filter 10. The valve 14 is coupled to a controller 16 (e.g., slurry concentration controller 16). The controller 16 is configured to control removal of the liquid via the filter 10 to adjust the concentration of the solid fuel in the fuel slurry. For example, the controller 16 is configured to regulate the valve 14, thus controlling the amount of liquid removed from the slurry. In some embodiments, the controller 16 may be configured to control a purge system via another valve 14 to clean or purge the filter 10. In other embodiments, the controller 16 may also be configured to control the concentration of the solid fuel in the fuel slurry by regulating an agitation system and/or heating system.

From the filter 10, the slurry is delivered to a gasifier 106, e.g., via a fuel slurry injector. The gasifier 106 converts the feedstock 102 into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius to 1600 degrees Celsius, depending on the type of gasifier 106 utilized.

The gasification process includes the feedstock undergoing a pyrolysis process, whereby the feedstock is heated. Temperatures inside the gasifier 106 may vary during the pyrolysis process, depending on the fuel source 102 utilized to generate the feedstock. The heating of the feedstock during the pyrolysis process generates a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A partial oxidation process also occurs in the gasifier 106. The oxidation process may include introducing oxygen to the char and residue gases. The char and residue gases react with the oxygen to form carbon dioxide and carbon monoxide, which provides heat for the gasification reactions. The temperatures during the partial oxidation process may range from approximately 700 degrees Celsius to 1600 degrees Celsius. Steam may be introduced into the gasifier 106 during gasification. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon monoxide and release energy, which drives a second reaction that converts further feedstock to hydrogen and additional carbon dioxide.

In this way, a resultant gas is manufactured by the gasifier 106. This resultant gas may include approximately 85% of carbon monoxide and hydrogen in equal proportions, as well as $CH_4$, HCl, HF, COS, $NH_3$, HCN, and $H_2S$ (based on the sulfur content of the feedstock). This resultant gas may be termed untreated, raw, or sour syngas, since it contains, for example, $H_2S$. The gasifier 106 may also generate waste, such as slag 108, which may be a wet ash material. This slag 108 may be removed from the gasifier 106 and disposed of, for example, as road base or as another building material. Prior to cleaning the raw syngas, a syngas cooler 107 may be utilized to cool the hot syngas. The cooling of the syngas may generate high pressure steam which may be utilized to produce electrical power as described below. After cooling the raw syngas, a gas cleaning unit 110 may be utilized to clean the raw syngas. The gas cleaning unit 110 may scrub the raw syngas to remove the HCl, HF, COS, HCN, and $H_2S$ from the raw syngas, which may include separation of sulfur 111 in a sulfur processor 112 by, for example, an acid gas removal process in the sulfur processor 112. Furthermore, the gas cleaning unit 110 may separate salts 113 from the raw syngas via a water treatment unit 114 that may utilize water purification techniques to generate usable salts 113 from the raw syngas. Subsequently, the gas from the gas cleaning unit 110 may include treated, sweetened, and/or purified syngas, (e.g., the sulfur 111 has been removed from the syngas), with trace amounts of other chemicals, e.g., $NH_3$ (ammonia) and $CH_4$ (methane).

A gas processor 116 may be utilized to remove residual gas components 117 from the treated syngas such as, ammonia and methane, as well as methanol or any residual chemicals. However, removal of residual gas components 117 from the treated syngas is optional, since the treated syngas may be utilized as a fuel even when containing the residual gas components 117, e.g., tail gas. At this point, the treated syngas may include approximately 40% CO, approximately 40% $H_2$, and approximately 20% $CO_2$ and is substantially stripped of $H_2S$. This treated syngas may be transmitted to a combustor 120, e.g., a combustion chamber, of a gas turbine engine 118 as combustible fuel. Alternatively, the $CO_2$ may be removed from the treated syngas prior to transmission to the gas turbine engine 118.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The IGCC system 100 may also include the HRSG 138. High pressure steam may be transported into the HSRG 138 from the syngas cooler 107. Also, heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, along with the steam generated by the syngas cooler 107, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
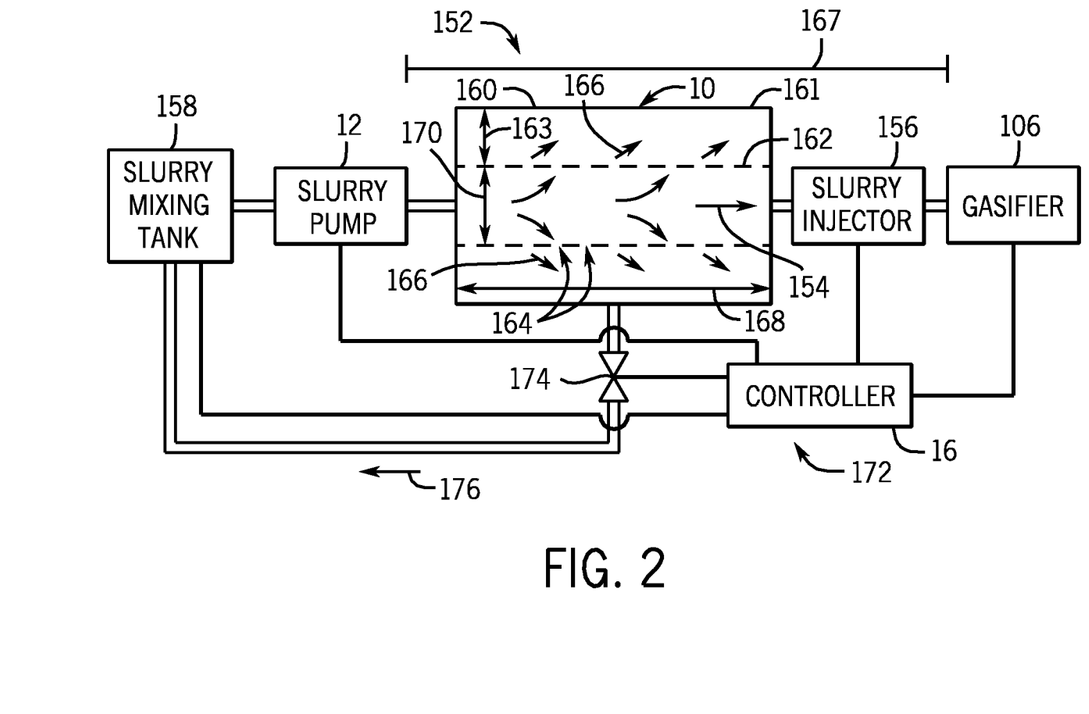
FIG. 2 is a schematic block diagram of an embodiment of a filtration system employed upstream of a gasifier.

FIGS. 2-7 illustrate various embodiments of filtration systems associated with the filter 10. FIG. 2 is a schematic block diagram of an embodiment of a filtration system 152 employed upstream of a gasifier 106. The filtration system 152 is designed to increase the concentration of solid fuel within a fuel slurry prior to gasification, but subsequent to pumping of the fuel slurry. The filtration system 152 includes the filter 10 disposed in a slurry flow path, indicated generally by arrow 154, downstream of a fuel slurry pump 12. The filter 10 is also disposed upstream of a fuel slurry injector 156. The filter 10 may be a cross-flow filter 10 as described above. Upstream of the slurry pump 12, a slurry mixing tank 158 is configured to prepare the fuel slurry by mixing solid fuel with liquid (e.g., water) to create a suspension. The slurry mixing tank 158 is configured to deliver the fuel slurry to the slurry pump 12. The slurry pump 12 is configured to pump the fuel slurry along the slurry flow path 154 having the cross-flow filter 10. The slurry flow path 154 extends through an enclosure 160 of the cross-flow filter 10. In addition, the slurry flow path 154 is surrounded by a filter medium 162. For example, the filter medium 162 may be a hollow cylindrical (e.g., annular) filter medium, which may be offset from an outer wall 161 of the enclosure 160 by an offset distance 163. The filter medium 162 may be welded to the enclosure 160. The filter medium 162 includes perforations 164 as described above. The cross-flow filter 10 is configured to remove at least a portion of the liquid from the fuel slurry to increase the concentration of the solid fuel in the fuel slurry. As the fuel slurry flows tangentially along the slurry flow path 154 and through the cross-flow filter 10, a portion of the liquid is forced through the perforations 164 of the filter medium 162, as indicated generally be arrows 166, as a filtrate due to high velocity and positive pressure. The high velocity and positive pressure also maintains the solid fuel within the fuel slurry as well as the solid fuel moving along the slurry flow path 154, thus, the concentration of the solid fuel within the fuel slurry is increased. The flow of the fuel slurry also cleans the filter medium 162 resulting in self-cleaning of the filter 10. The filter 10 may remove any amount of the liquid from the fuel slurry. For example, the filter 10 may remove 1 to 20, 1 to 10, or 1 to 5 percent of the liquid from the fuel slurry.

The pressure within the filter 10 may range from 400 psi to 1400 psi. For example, the pressure may be 400, 500, 600, 700, 800, 900, 1000, 1100, 1200, 1300, and 1400, or any pressure therebetween. Beside pressure, other factors of the filter 10 may be adjusted that affect the flow of the fuel slurry. A length 167 (e.g., for a pipeline) between the pump 12 and the gasifier 106 may range from approximately 100 feet to 300 feet. For example, the length 167 may be approximately 100, 125, 150, 175, 200, 225, 250, 275, or 300 feet, or any distance therebetween. A length 168 of the filter 10 may range from approximately 6 feet to 50 feet or any other suitable length. For example, the filter length 168 may be approximately 6, 10, 20, 30, 40, or 50 feet, or any distance therebetween. A width 170 of the filter medium 162 within the filter 10 may range from approximately 4 inches to 8 inches or any other suitable width. For example, the width 170 may be approximately 4, 5, 6, 7, or 8 inches, or any distance therebetween. Adjustment of the length 168 of the filter 10 and the width 170 of the filter medium 162 may allow control of both the flow velocity as well as the pressure within the filter 10.

Upon flowing through the filter 10, the slurry fuel is received by the slurry injector 156. The slurry injector 156 is configured to receive and inject the fuel slurry into the gasifier 106. The gasifier 106 is configured to generate a syngas, as described above, from the fuel slurry. Increasing the concentration of the solid fuel in the fuel slurry post-pumping may improve carbon conversion and cold gas efficiency in the gasification of the fuel slurry, while avoiding the problems associated with pumping higher concentrated slurries.

The filtration system 152 also includes a control system 172 configured to control removal of the liquid (e.g., water) via the cross-flow filter 10 to adjust the concentration of the solid fuel in the fuel slurry. The control system 172 includes controller 16 (e.g., slurry concentration controller 16). The controller 16 is configured to control the concentration of the solid fuel in the fuel slurry for gasification. In particular, the controller 16 is configured to adjust removal of the liquid from the fuel slurry via the cross-flow filter 10. In certain embodiments, a valve 174 maintains the flow rate of the liquid removed from the fuel slurry at a constant rate to control the concentration. In other embodiments, the valve 174 may be controlled to provide a variable flow rate based on the feedback. The liquid removed or filtrate is recirculated to the slurry mixing tank 158, as generally indicated by arrow 176, for mixing with solid fuel to form more fuel slurry. The controller 16 is coupled to the valve 174. The controller 16 determines the flow rate of the liquid removed by adjusting valve 174. For example, the valve 174 may be closed to prevent the removal of liquid from the fuel slurry. Alternatively, the valve 174 may be opened to a varying degree to determine the flow rate of liquid removed. The controller 16 is responsive to user input and feedback to adjust the flow rate. For example, controller 16 may be responsive to feedback from system components related to the concentration of the solid fuel in the fuel slurry. By further example, the feedback may come from transducers located at various system components, such as the slurry mixing tank 158, the slurry pump, the valve 174, and/or the slurry injector 156. The feedback may also be indirectly related to the concentration of the solid fuel in the fuel slurry. For example, transducers may be located at the gasifier 106 to provide feedback as to the performance of the gasifier 106 or the heating value of the fuel slurry, which may be indirect indicators of the concentration of the solid fuel in the fuel slurry. The feedback may include an actual measurement of the concentration of the solid fuel in the fuel slurry. Also, the feedback may include measurements of other parameters indirectly related to the concentration of the solid fuel in the fuel slurry, such as temperature, pressure, and/or other parameters. From the feedback, the concentration of the solid fuel in the fuel slurry is controlled via the cross-flow filter 10.

Figure 3:
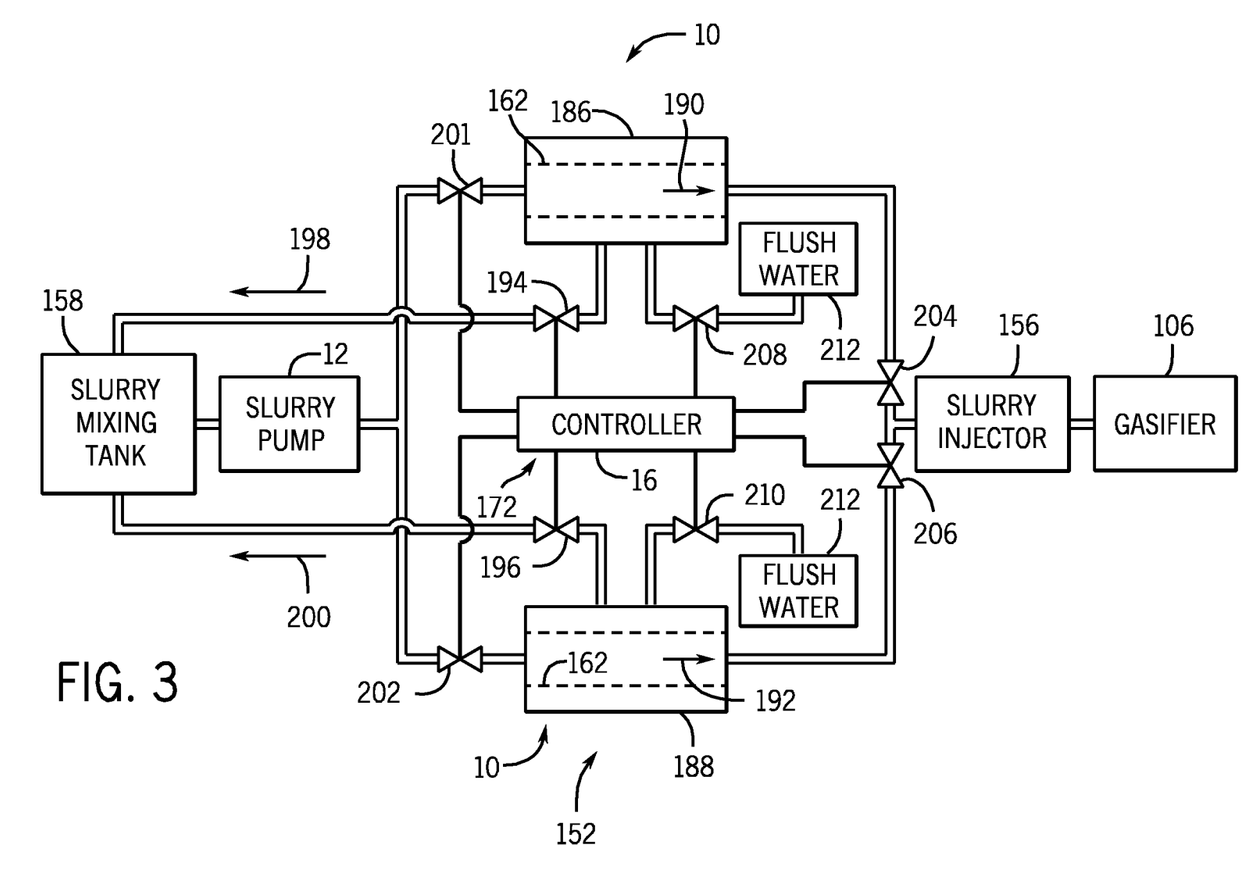
FIG. 3 is a schematic block diagram of an embodiment of the filtration system employing multiple filters in parallel.

Embodiments of the filtration system 152 may include multiple filters 10. FIG. 3 is schematic block diagram of an embodiment of the filtration system 152 employing multiple filters 10 in parallel. As above, the filtration system 152 is designed to increase the concentration of solid fuel within the fuel slurry prior to gasification, but subsequent to pumping of the fuel slurry. The filtration system 152 includes both a first cross-flow filter 186 and a second cross-flow filter 188 disposed in parallel along first and second slurry flow paths, respectively, indicated generally by arrows 190 and 192, downstream of the fuel slurry pump 12. In other embodiments, the filtration system 152 may include more than 2 filters 10 in parallel. For example, the filtration system 152 may include 3 to 5 or more filters 10. The slurry pump 12 is coupled to the slurry mixing tank 158 disposed upstream of the pump 12. The slurry mixing tank 158 and the slurry pump 12 are as described above. The cross-flow filters 186 and 188 are also disposed upstream of the fuel slurry injector 156. The fuel slurry injector 156 is coupled to the gasifier 106 disposed downstream of the fuel slurry injector 156. The fuel slurry injector 156 and the gasifier 106 are as described above.

Each cross-flow filter 186 and 188 operates individually as described above. The first cross-flow filter 186 is configured to remove at least a first portion of the liquid from the fuel slurry, while the second cross-flow filter is configured to remove at least a second portion of the liquid from the fuel slurry. The cross-flow filters 186 and 188 may be operated separately or simultaneously by the control system 172. In particular, the controller 16 controls each cross-filter 186 and 188 as described above. For example, the controller 16 is coupled to valves 194 and 196 of filters 186 and 188, respectively, and configured to control the concentration of the solid fuel in the fuel slurry. Removed liquid from the fuel slurry is recirculated to the slurry mixing tank 158, as indicated generally by arrows 198 and 200. The controller 16 is also coupled to valves 201 and 202 disposed in the first and second slurry flow paths 190 and 192, respectively, between the slurry pump 12 and the filters 186 and 188. By opening and closing valves 201 and 202, the controller 16 determines if one or both of the cross-flow filters 186 and 188 may be used in the filtration system 152. For example, the controller 16 may open valve 201 allowing the use of the first cross-flow filter 186, while closing valve 202 preventing the used of the second cross-flow filter 188, and vice versa. Alternatively, the controller 16 may open both valves 200 and 202 allowing the use of both filters 186 and 188. When using both filters 186 and 188, the controller 16 may adjust the valves 201 and 202 to allow the same and/or different flow amounts of fuel slurry. In addition, when both filters are used simultaneously, the controller 16 can adjust valves 194 and 196 to allow the same and/or different removal rates of liquid from the fuel slurries in the respective slurry flow paths 190 and 192.

In addition, the controller 16 controls purging or cleaning of the filters 186 and 188. The controller 16 is coupled to valves 204 and 206 disposed in the first and second slurry flow paths 190 and 192, respectively, downstream of the filters 186 and 188 and upstream of the fuel slurry injector 156. Opening of valves 204 and 206 allows the concentrated fuel slurry to flow to the fuel slurry injector 156, and then the gasifier 106 as described above. In addition, the controller 16 is coupled to valves 208 and 210. The controller 16 controls the opening and closing of valves 208 and 210 to allow a flow of liquid (e.g., water) from a liquid source 212 (e.g., flush water) to flush the filters 186 and 188. For example, the controller 16 may close valves 194, 196, 201, 202, 204, and 206, and open valves 194, 196, 208, and 210 to allow the cleaning of the each filter medium 162 of the filters 186 and 188 by the flushing liquid. The flushing liquid flows upstream through filters 186 and 188 and subsequently paths 198 and 200 to the slurry mixing tank 158 for mixing of the liquid with the solid fuel to form more fuel slurry. Conversely, valves 208 and 210 may be closed, and the other valves opened to enable control of the concentration of the solid fuel in the fuel slurry. However, by opening the valves 194, 196, 208, and 210, the controller 16 is configured to allow purging in both filters 186 and 188 simultaneously or individually. In addition, the controller 16 is configured to enable control of the concentration of the solid fuel in one filter 186 or 188, while simultaneously allowing purging in the other filter 186 or 188. Use of multiple filters 10 in parallel may allow the removal of more moisture from the fuel slurry than an individual filter 10. In addition, having multiple filters 10 in parallel allows the operation of one filter 10, when the other filter 10 is not available for use (e.g., in need of servicing).

Figure 4:
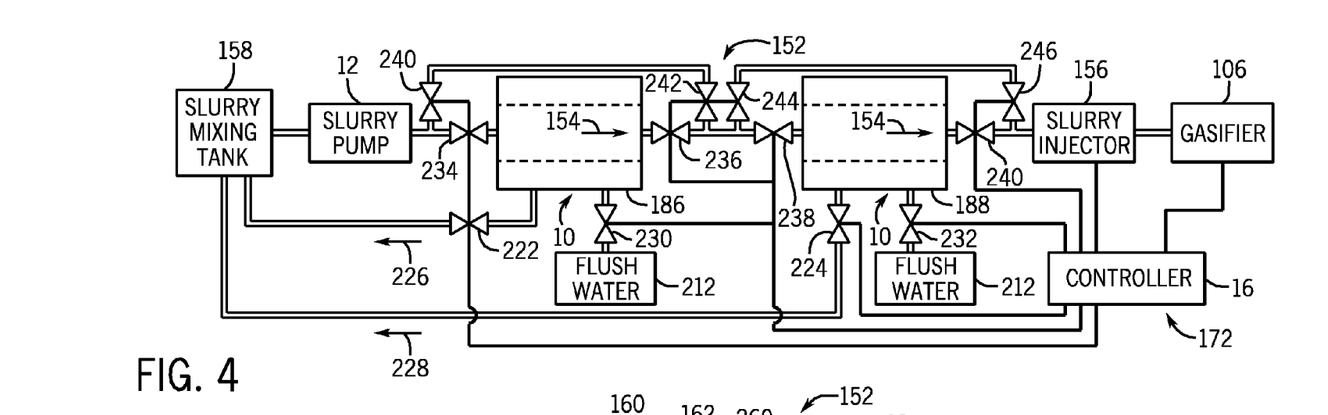
FIG. 4 is a schematic block diagram of an embodiment of the filtration system employing multiple filters in series.

Besides filters 10 in parallel, the filtration system 152 may include filters 10 in series. FIG. 4 is a schematic block diagram of an embodiment of the filtration system 152 employing multiple filters 10 in series. As above, the filtration system 152 is designed to increase the concentration of the solid fuel within the fuel slurry prior to gasification, but subsequent to pumping of the solid fuel slurry. The filtration system 152 includes both the first cross-flow filter 186 and the second cross-flow filter 188 disposed in series along the slurry flow path 154 downstream of the fuel slurry pump 12, where filters 186 and 188 are configured to remove at least first and second portions, respectively, of the liquid from the fuel slurry. In other embodiments, the filtration system 152 may include more than 2 filters 10 in series. For example, the filtration system may include 3 to 5 or more filters 10. As described above, the slurring mixing tank 158 is disposed upstream of the filters 186 and 188, while the slurry fuel injector 156 and the gasifier 106 are disposed downstream of the filters 186 and 188.

As above, the cross-flow filters 186 may be operated separately or simultaneously via the control system 172. The controller 16 controls each cross-filter 186 and 188 as described above. For example, the controller 16 is coupled to valves 222 and 224 of filters 186 and 188, respectively, and configured to control the concentration of the solid fuel in the fuel slurry via removal of the liquid from the fuel slurry. As above, the controller 16 can adjust valves 222 and 224 to allow the same and/or different removal rates of liquid from the fuel slurry in the same slurry flow path 154. The removed liquid is recirculated back to the mixing tank via paths 226 and 228 to produce more fuel slurry as described above. Also, as described above, the controller 16 is coupled to valves 230 and 232 to allow the flushing of filters 186 and 188 with liquid (e.g., water) from flushing liquid source 212.

The controller 16 is coupled to valves 234 and 236 to control flow of the fuel slurry into and out of the first cross-flow filter 186. The controller 16 is also coupled to valves 238 and 240 to control the flow of the fuel slurry into and out of the second cross-flow filter 188. In addition, the controller 16 is coupled to valves 240 and 242 to allow bypass of the first cross-flow filter 186 when valves 240 and 242 are open and valves 234 and 236 are closed. The controller 16 is coupled to valves 244 and 246 to allow bypass of the second cross-flow filter 188 when valves 244 and 246 are open and valves 238 and 240 are closed. The coupling of the controller 16 to all of these valves allows the controller 16 to control the removal of water from the fuel slurry using filters 186 and 188 either serially or individually. Using the filters 186 and 188 serially may allow the solid fuel to be concentrated in the fuel slurry to a greater extent than using either filter 186 or 188 individually. In addition, the controller 16 is configured to control simultaneous or independent purging of the filters 186 and 188. Further, the controller 16 is configured to enable control of the concentrating of the solid fuel in the fuel slurry using filter 186 or 188, while simultaneously purging the other filter 186 or 188. The controller 16, as above, is responsive to user input as to the flow rate as well as responsive to feedback from system components related to the concentration of the solid fuel in the fuel slurry. For example, the feedback may come from transducers located at various system components, e.g., the mixing tank 158, slurry injector 156, and/or gasifier 106. As described above, the feedback may be direct or indirect measurements related to solid fuel concentration in the fuel slurry.

Figure 5:
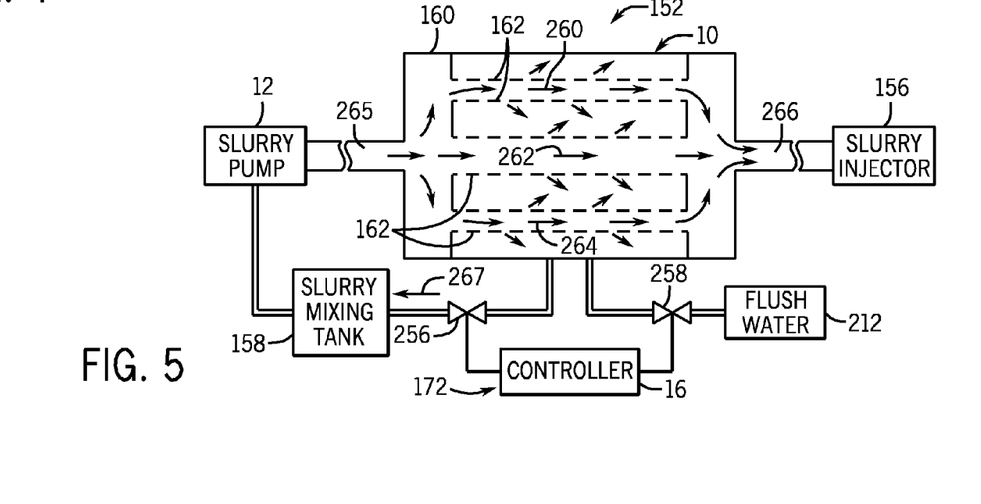
FIG. 5 is a schematic block diagram of an embodiment of the filtration system employing multiple flow passages within a filter.

Besides including multiple filters 10, the filtration system 152 may include filters 10 with different embodiments to help concentrate the solid fuel in the fuel slurry. FIG. 5 is a schematic block diagram of an embodiment of the filtration system 152 employing multiple flow passages within the filter 10. As above, the slurry mixing tank 158 and slurry pump 12 are disposed upstream of the cross-flow filter 10. The slurry injector 156 is disposed downstream of the filter 10. Also, as above, the controller 16 controls the removal of liquid from and the purging of the filter 10 via valves 256 and 258, respectively. The illustrated cross-flow filter 10 includes enclosure 160 and multiple slurry flow paths 260, 262, and 264 extending through the enclosure 160. Each slurry flow path 260, 262, and 264 is surrounded by filter medium 162 (e.g., an annular filter medium). The fuel slurry is received by the filter 10 near an inlet 265 of the filter 10, whereupon the fuel slurry is divided among slurry flow paths 260, 262, and 264. Liquid (e.g., water) is then removed from the fuel slurry as the slurry flows tangentially across each filter medium 162 of each slurry flow path 260, 262, and 264 as described above. The removed liquid or filtrate is recirculated back to the slurry mixing tank via path 267 to be used in preparing more fuel slurry. After flowing through each filter medium 162, the concentrated slurry exits the filter 10 at outlet 266 to the slurry injector 156 for injection to the gasifier 106. The use of multiple flow passages may increase the amount of liquid that may be removed from the slurry, thus, concentrating the solid fuel within the fuel slurry prior to gasification. As a result, carbon conversion and cold gas efficiency may be improved in the gasification of the fuel slurry.

Figure 6:
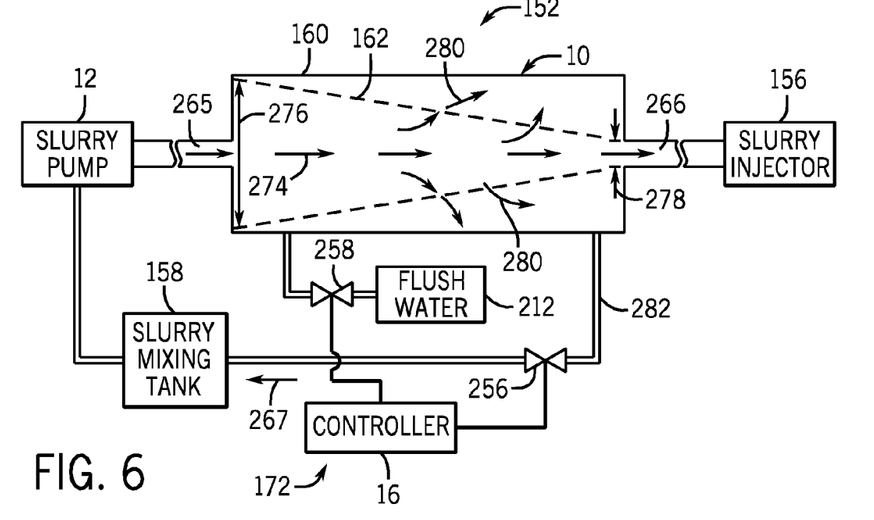
FIG. 6 is a schematic block diagram of an embodiment of the filtration system employing a converging filter.

Alternatively, the filtration system 152 may include filter 10 that converges. For example, FIG. 6 is a schematic block diagram of an embodiment of the filtration system 152 employing a converging filter 10. The filtration system 152 and other components are as described in FIG. 5 except for the filter design. The illustrated cross-flow filter 10 includes enclosure 160. The cross-flow filter 10 includes a slurry flow path, indicated generally by arrow 274, extending through the enclosure 160. The slurry flow path 274 is surrounded by filter medium 162. The filter medium 162 converges in a downstream direction along the slurry flow path 274 from the inlet 265 to the outlet 266 of the cross-flow filter 10. For example, the filter medium 162 may be a hollow conical filter medium 162. As the fuel slurry enters at the inlet 265, the filter medium 162 has width 276. As the concentrated fuel slurry exits at outlet 266, the filter medium 162 has width 278. In certain embodiments, the width 276 may range from approximately 2 to 10 times larger than width 278. For example, the width 276 may be approximately 2, 4, 6, 8, or 10 times larger than width 278. The converging filter medium 162 creates more shear along its surface as the slurry flows downstream. The increased shear may result in the removal of more liquid from the fuel slurry by the filter medium 162, as generally indicated by arrows 280. The removal of more liquid may allow a higher concentration of the solid fuel in the fuel slurry prior to gasification. As described above, the removed liquid or filtrate is recirculated via path 267 to the slurry mixing tank 158. In the illustrated embodiment, an inlet 282 to liquid removal path 267 is located more towards the outlet 264 of the filter 10, since a larger portion of removed liquid may be located towards that portion of the filter 10. In other embodiments, the inlet 282 to path 267 may be disposed along other portions of the filter 10.

Figure 7:
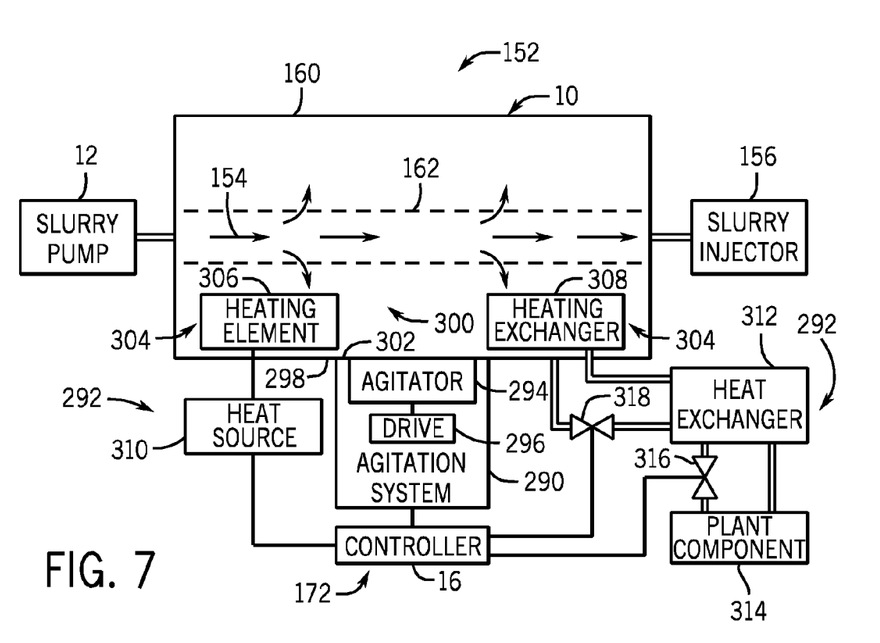
FIG. 7 is a schematic block diagram of an embodiment of the filtration system employing agitation and heating systems.

As previously mentioned, the filtration system 152 may include other systems for helping concentrate the solid fuel in the fuel slurry. FIG. 7 is a schematic block diagram of an embodiment of the filtration system 152 employing agitation and heating systems. As above, the filtration system 152 includes the filter 10 disposed in the slurry flow path 154 downstream from the fuel slurry pump 12 as well as upstream of the fuel slurry injector 156. As above, the cross-flow filter 10 includes enclosure 160 and filter medium 162. The filter 10 may remove liquid from the fuel slurry as described above. Besides the filter 10, the filtration system 152 includes an agitation system 290 and a heating system 292 coupled to the cross-flow filter 10. The agitation system 290 includes an agitator 294 coupled to a drive 296. The drive 296 is configured to cause the agitator 294 to agitate. The agitator 294 is configured to agitate the cross-flow filter 10. As illustrated, the agitator 294 is disposed on an outer surface 298 of the enclosure 160. In certain embodiments, the agitator 294 is disposed within an inner volume 300 of the filter 10. For example, the agitator 294 may be located on an inner surface 302 of the enclosure 160 or directly on the filter medium 162. Agitation or vibration of the cross-flow filter 10 removes any potential filter cake or particles that may bind to the filter medium 162. This keeps the filter 10 clean and allows a constant removal of the liquid from the fuel slurry to concentrate the solid fuel in the slurry.

As mentioned, the filtration system 152 includes the heating system 292. The heating system 292 includes at least one heater 304 configured to heat the cross-flow filter 10. Heating of the cross-flow filter 10 allows the removal of more liquid from the fuel slurry to further concentrate the solid fuel in the fuel slurry. The heater 304 may include a heating element 306 and a heat exchanger 308. As illustrated, the heating element 306 and the heat exchanger 308 are disposed within the inner volume 300 of the filter 10 on the inner surface 302 of the enclosure 160. In other embodiments, the heating element 306 and/or heat exchanger 308 may be disposed directly on the filter medium 162. Alternatively, the heating element 306 and/or heat exchanger 308 may be disposed on the outer surface 298 of the enclosure 160.

Heat is provided to the heating element 306 via an external heat source 310. The heat source 310 may include steam, combustion exhaust (e.g., from a gas turbine, boiler, or furnace), heated process water, or waste heat. For example, the waste heat may be obtained from a variety of plant components, such as a gas treatment unit, a compressor, an engine, or a component of an integrated gasification combined cycle (IGCC) system. A heat exchanger 312 may transfer heat from a variety of plant components 314 or external heat source to heat exchanger 308, and then heat exchanger 308 may transfer the heat directly to the cross-flow filter 10 or indirectly with a heat transfer medium. For example, the heat exchanger 308 may transfer heat to the enclosure 160, the inner volume 300 of the filter 10, or the filter medium 162.

The controller 16 (e.g., slurry concentration controller 16) is coupled to both the agitation system 290 and the heating system 292. The controller 16 is configured to control the agitation system 290 to agitate the cross-flow filter 10. The controller 16 may be responsive to feedback, as described above, to control the agitation system 290. Also, the controller 16 is configured to control the heating system 292 to heat the cross-flow filter 10. For example, the controller 16 is coupled to the heat source 310 to control the heat provided to the heating element 306. In addition, the controller 16 is coupled to valves 316 and 318 to control the exchange of heat from the plant components 314 to heat exchanger 312 as well as the transfer of heat from heat exchanger 312 to heat exchanger 308, and then to the cross-flow filter 10. The controller 16 may be responsive to feedback, as described above, to control the heating system 292. Control of the agitation system 290 and the heating system 292, as well as liquid removal as described above, allow the controller 16 to determine the amount of liquid removed from the fuel slurry to concentrate the solid fuel in the fuel slurry.

In certain embodiments, a method may include concentrating the fuel slurry via cross-flow filtration and gasifying the concentrated fuel slurry. For example, the method may include controlling the concentration of the solid fuel in the fuel slurry at least partially by adjusting removal of the liquid from the fuel slurry via the cross-flow filter 10 as described above. Controlling the concentration may include controlling agitation of the cross-flow filter 10 as described above. Also, controlling the concentration may include controlling heating of the cross-flow filter 10 as described above. Further, the method may include gasifying the fuel slurry in the gasifier 106 downstream from the cross-flow filter 10.

Technical effects of the disclosed embodiments include employing cross-flow filtration of the fuel slurry downstream of the fuel slurry pump 12 and upstream of the fuel slurry injector 156. Disposing the cross-flow filter 10 between the pump 12 and injector 156 allows liquid to be removed from the fuel slurry to obtain a higher concentration of solid fuel in the slurry post-pumping. Increasing the obtainable concentration levels of the solid fuel in the fuel slurry post-pumping avoids problems associated with pumping higher concentration slurries and may also improve carbon conversion and cold gas efficiency in the gasification of the fuel slurry. The desired concentration may also be regulated via the control system 172.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a first cross-flow filter configured to remove at least a first portion of a liquid from a fuel slurry to increase a concentration of a solid fuel in the fuel slurry; and
    a gasifier configured to generate a syngas from the fuel slurry.

2. The system of claim 1, comprising a fuel slurry injector configured to receive and inject the fuel slurry into the gasifier.

3. The system of claim 1, comprising a fuel slurry pump configured to pump the fuel slurry along a slurry flow path having the first cross-flow filter.

4. The system of claim 3, wherein the first cross-flow filter is disposed in a slurry flow path downstream from the fuel slurry pump.

5. The system of claim 1, comprising an agitation system coupled to the first cross-flow filter, wherein the agitation system comprises an agitator configured to agitate the first cross-flow filter.

6. The system of claim 1, comprising a heating system coupled to the first cross-flow filter, wherein the heating system comprises at least one heater configured to heat the first cross-flow filter.

7. The system of claim 1, comprising a control system configured to control removal of the liquid via the first cross-flow filter to adjust a concentration of the solid fuel in the fuel slurry.

8. The system of claim 1, comprising a second cross-flow filter configured to remove at least a second portion of the liquid from the fuel slurry.

9. The system of claim 8, wherein the first and second cross-flow filters are disposed in parallel along first and second slurry flow paths, respectively.

10. The system of claim 8, wherein the first and second cross-flow filters are disposed in series along a slurry flow path.

11. The system of claim 1, wherein the first cross-flow filter comprises a plurality of slurry flow paths extending through an enclosure, wherein each slurry flow path is surrounded by a filter medium.

12. The system of claim 1, wherein the first cross-flow filter comprises a slurry flow path extending through an enclosure, wherein the slurry flow path is surrounded by a filter medium, and the filter medium converges in a downstream direction along the slurry flow path.

13. A system, comprising:
    a slurry concentration controller configured to control a concentration of a solid fuel in a fuel slurry for gasification, wherein the slurry concentration controller is configured to adjust removal of a liquid from the fuel slurry via a cross-flow filter positioned upstream of a gasifier.

14. The system of claim 13, comprising the cross-flow filter, wherein the cross-flow filter is configured to remove at least a first portion of a liquid from the fuel slurry to increase the concentration of the solid fuel in the fuel slurry.

15. The system of claim 13, comprising the gasifier, wherein the gasifier is configured to generate a syngas from the fuel slurry.

16. The system of claim 13, wherein the slurry concentration controller is configured to control an agitation system to agitate the cross-flow filter.

17. The system of claim 13, wherein the slurry concentration controller is configured to control a heating system to heat the cross-flow filter.

18. A method, comprising:
    controlling a concentration of a solid fuel in a fuel slurry at least partially by adjusting removal of a liquid from the fuel slurry via a cross-flow filter; and
    gasifying the fuel slurry in a gasifier downstream from the cross-flow filter.

19. The method of claim 18, wherein controlling the concentration comprises controlling agitation of the cross-flow filter.

20. The method of claim 18, wherein controlling the concentration comprises controlling heating of the cross-flow filter.

* * * * *